J. B. ETHERIDGE.
HOE.
APPLICATION FILED NOV. 20, 1912.

1,061,057.

Patented May 6, 1913.

Witnesses
Philip E. Barnes
V. B. Hillyard.

Inventor
J. B. Etheridge
By Victor J. Evans
Attorney

UNITED STATES PATENT OFFICE.

JOHN BLAKELEY ETHERIDGE, OF HALLSVILLE, TEXAS.

HOE.

1,061,057.

Specification of Letters Patent.

Patented May 6, 1913.

Application filed November 20, 1912. Serial No. 732,557.

*To all whom it may concern:*

Be it known that I, JOHN B. ETHERIDGE, a citizen of the United States, residing at Hallsville, in the county of Harrison and State of Texas, have invented new and useful Improvements in Hoes, of which the following is a specification.

This invention has relation to garden hoes used for weeding purposes and which at the same time may be utilized for dropping seed, the handle of the implement being hollow to receive a quantity of seed and having a mechanism applied thereto for controlling the delivery of the seed as may be required.

The invention relates most especially to the seed controlling mechanism, whereby the same may be applied to different hoes or is made adjustable to suit the convenience of the gardener or person using the implement.

The invention consists of the novel features, details of construction and combination of parts, which hereinafter will be more particularly set forth, illustrated in the accompanying drawing, and pointed out in the appended claims.

Figure 1:
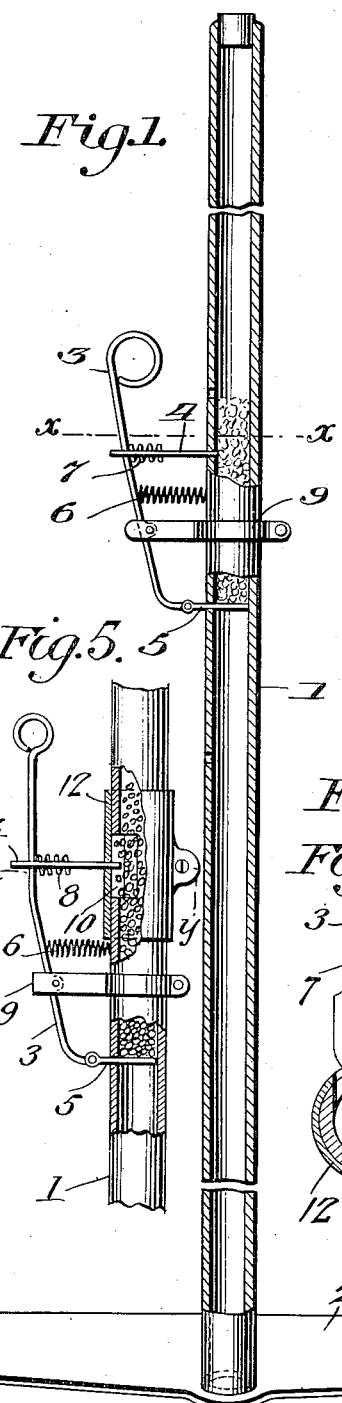
Figure 2:
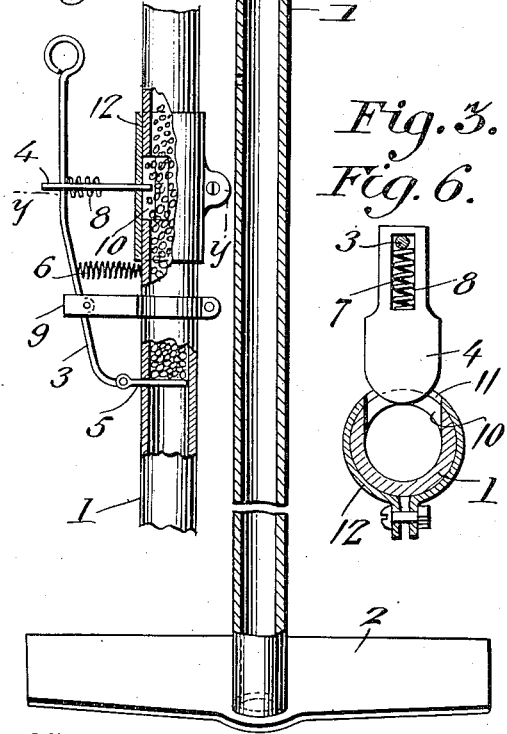
Figure 3:
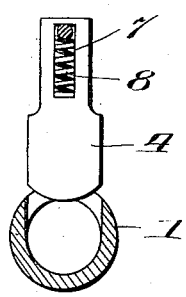
Figure 4:
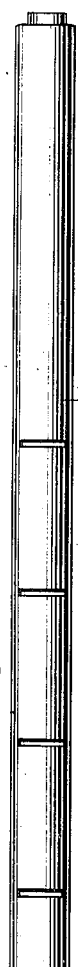
Figure 5:
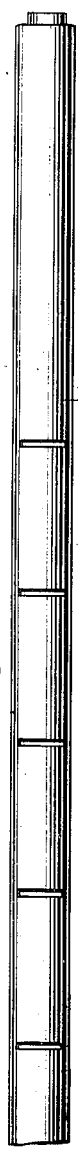
Figure 6:
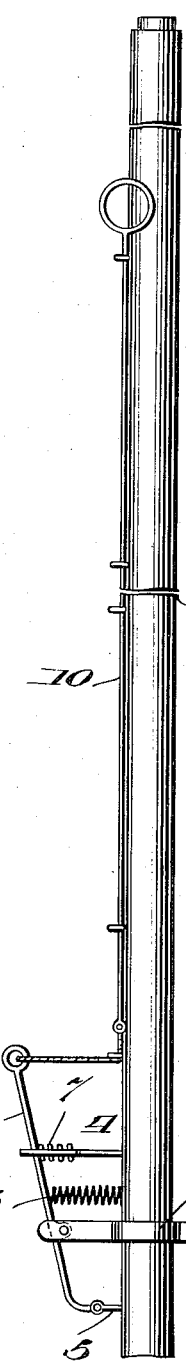

Referring to the drawing, forming a part of the specification, Figure 1 is a central longitudinal section of a garden hoe embodying the invention. Fig. 2 is a section on the line $x$—$x$ of Fig. 1. Fig. 3 is a detail view of a modification. Fig. 4 is a further modification. Fig. 5 is a modification showing means for varying the discharge of the seed. Fig. 6 is a section on the line $y$—$y$ of Fig. 5.

Corresponding and like parts are referred to in the following description, and indicated in all the views of the drawing, by the same reference characters.

The implement comprises the usual handle 1 and blade 2. In accordance with this invention the handle 1 is bored or formed with an opening to receive the seed and to direct such seed when released into the opening provided in the ground for its reception. A mechanism is provided upon the handle at a convenient point for regulating the discharge of the seed, such mechanism embodying a lever 3 and cut-offs 4 and 5. The cut-offs 4 and 5 are arranged to operate through openings formed in a side of the handle 1 and have connection with the lever 3 upon opposite sides of its pivotal support so that when one cut-off is pressed inward the other cut-off is moved outward. A spring 6 normally holds the cut-off 5 pressed inward. This spring may be of any construction and arrangement. The free end of the lever 3 is adapted to be pressed inward, thereby projecting the cut-off 4 across the opening of the handle 1 and withdrawing the cut-off 5 so that the seed contained in the handle between the cut-offs 4 and 5 may pass through the lower portion of the handle into the ground.

The cut-off 4 is yieldably connected with the lever 3 so that in the event of its inner end catching a seed the lever 3 may be moved so as to completely withdraw the cut-off 5 from the path of the seed confined in the handle between the two cut-offs so that the seed thus released may have a free passage through the lower portion of the handle to the ground. A slot 7 is formed in the cut-off 4 and the lever 3 passes therethrough. A spring 8 is located in the slot 7 and is confined between the lower end thereof and the lever. In the event of the inner end of the cut-off 4 catching upon a seed when pressing the free end of the lever 3 inward said lever may continue to move so as to completely withdraw the cut-off 5 from the opening of the handle, the spring 8 being pressed to admit of such movement of the lever. The lever 3 may be pivotally connected to the handle in any manner and as shown a clamp 9 is fitted to the handle and is adjustable thereon. This construction admits of placing the regulating mechanism at any convenient position upon the handle.

In some instances it may be desirable to locate the seed controlling mechanism near the lower end of the handle and to place the operating part near the upper end of the handle, the two being connected by means of a wire or like part 10, as shown most clearly in Fig. 4.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended thereto.

In the modification shown in Figs. 5 and 6 provision is had for adjusting the distance between the cut-offs 4 and 5 so as to vary the amount of seed to be deposited in a hill. A slot 10 is formed in a side of the handle 1, said slot being covered by means of a clamp sleeve 12 in which is formed an opening 11 through which the cut-off 4 operates. It is to be remembered that the lever 3 passes loosely through the slot 7 of the cut-off 4, hence movement of the clamp sleeve 12 on the handle fixes the position of the cut-off 4 with reference to the lever 3.

Having thus described the invention what is claimed as new, is:—

1. In a garden hoe the combination of a handle having an opening therethrough, a lever mounted upon the handle, a cut-off having connection with the lever and adapted to operate through a lateral opening of the handle, a second cut-off arranged to operate through another opening in the side of the handle and provided with a slot through which the before mentioned lever passes, and a spring interposed between the said lever and the slotted cut-off to form a yielding connection between the two.

2. In combination with a hollow handle having an opening and a slot in a side thereof, means for covering the slot and having an opening therein and adapted to be secured to the handle in adjusted positions, cut-offs adapted to operate through the opening of the handle and the opening of the covering means, the distance between the cut-offs being adjustable to vary the discharge, and an operating lever for actuating the cut-offs.

In testimony whereof I affix my signature in presence of two witnesses.

JNO. BLAKELEY ETHERIDGE.

Witnesses:
   TOM H. ETHERIDGE, Jr.,
   J. C. HILL.